UNITED STATES PATENT OFFICE 2,340,690

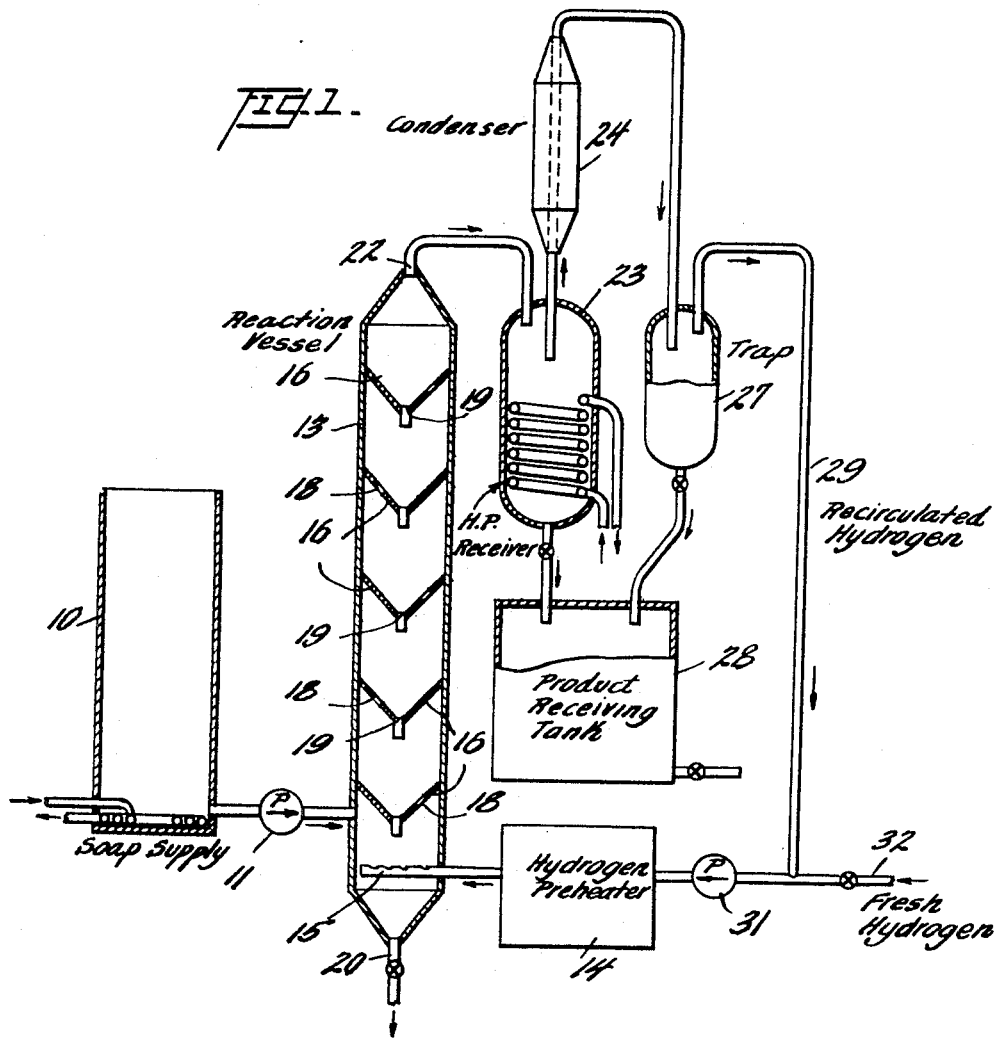

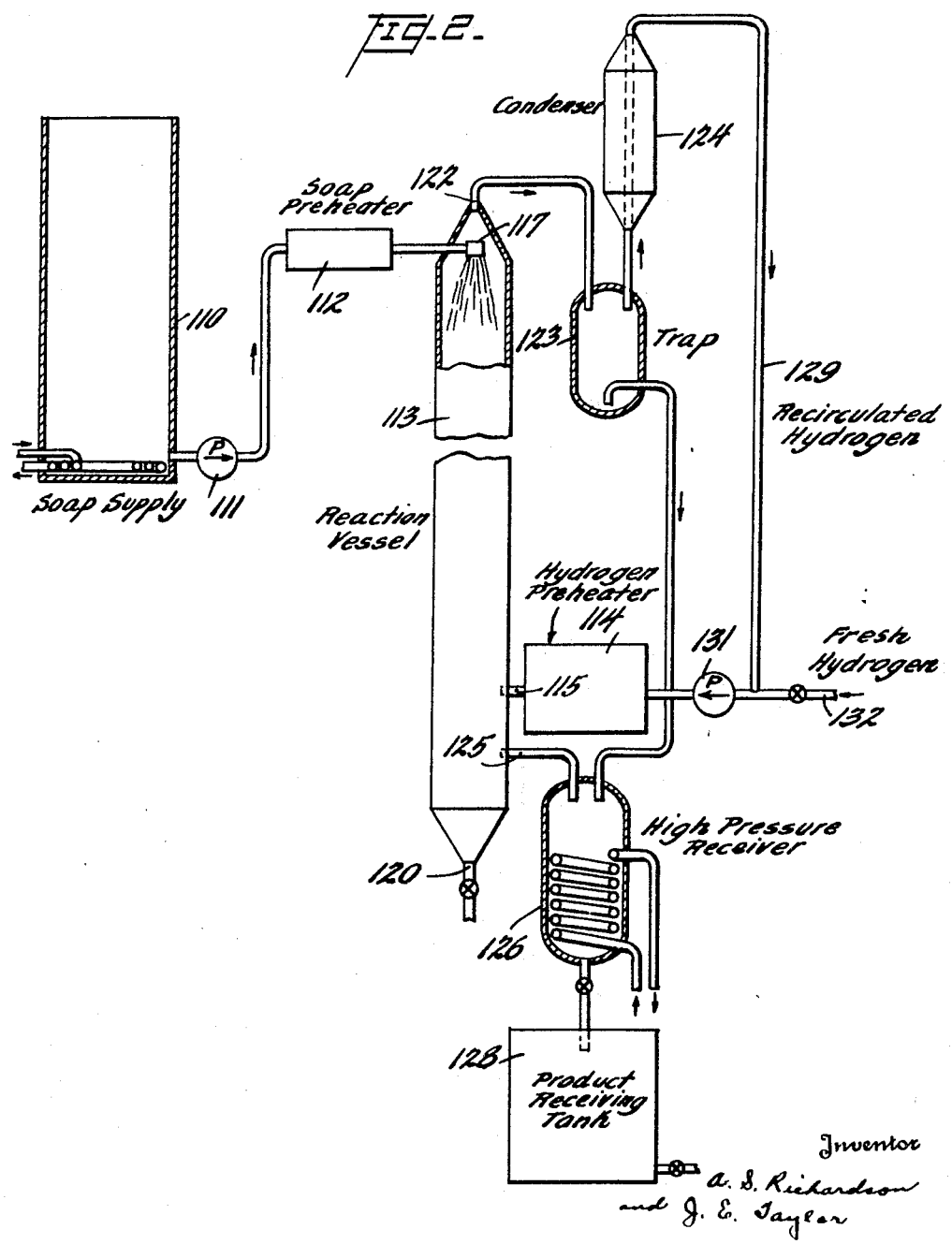

PROCESS FOR FORMING ALCOHOLS OR ESTERS

Albert S. Richardson, Wyoming, Ohio, and James E. Taylor, Louisville, Ky., assignors to The Procter and Gamble Company, Ivorydale, Ohio, a corporation of Ohio Application October 4, 1943, Serial No. 504,946

16 Claims. (Cl. 260—410.9)

This invention relates to a process for forming alcohols, or esters, or both, by reacting hydrogen with certain metallic salts of carboxylic acids.

More particularly, it relates to continuous operation of this basic process.

This process converts a salt of a carboxylic acid, which may be represented as $(R \cdot CO \cdot O)_x M$, where R is an organic radical, M is a metallic radical of a group which will be defined, and $x$ is a small whole number, into the corresponding alcohol which may be represented as $R \cdot CH_2 \cdot OH$. These reactants may react with another molecule of the salt or with the acid radical of this salt to form the corresponding ester, which may be represented as $R \cdot CO \cdot O \cdot CH_2 \cdot R$. Under conditions hereinafter described these main reactions may be accompanied by changes within the R group, e. g., addition of hydrogen if this is an unsaturated group.

This application is a continuation-in-part of our application Serial No. 380,072 which was filed February 21, 1941. That application describes processes comprising the high temperature and high pressure hydrogenation of certain metallic carboxylates to form the corresponding alcohols and/or esters of these alcohols with the corresponding fatty acids. The mode of operation specifically described in the aforementioned application is a batch process, which is often not as desirable for large scale commercial application as would be a continuous process.

An object of our invention is to reduce metallic salts of carboxylic acids to the corresponding alcohols, and/or esters thereof, in a continuous process suitable for economical commercial practice.

A further and more specific object of our invention is to reduce lead soaps of the higher fatty acids to fatty alcohols in a continuous manner.

Other objects will be apparent from the following disclosure of the invention.

Fatty alcohols have heretofore been prepared by high temperature, high pressure, catalytic hydrogenation of triglyceride fats or of fatty acids. This catalytic reaction has proven entirely too slow for satisfactory continuous operation, and in commercial practice it is carried out as a batch process. In contrast to this, we have found that under suitable conditions the direct hydrogenation of certain metallic carboxylates proceeds many times faster than the older catalytic hydrogenation of fats and fatty acids, and, in fact, that this reduction of metallic carboxylates is sufficiently rapid to permit conducting the process continuously with a relatively small reaction vessel. As an illustration of the speed of the reaction, we have obtained an eighty-five per cent reduction of lead soaps to the corresponding alcohols in about one minute, in a batch operation.

Alcohols or esters, or both, suitable for use in the manufacture of synthesis of detergents, of emulsifying or wetting agents, of plasticizing agents, of waxes, of drying compositions, and the like, may be formed by this process from fatty acids derived from naturally occurring fatty oils, from rosin, from oxidation of petroleum products, or from other sources. Primary aliphatic alcohols other than the fatty alcohols, and primary aromatic alcohols, as well as esters of these alcohols may also be made by our process.

Raw materials for the process, and uses for the resulting alcohols and esters, are so numerous and varied that our invention will find application in the preparation of many products other than those specifically named herein.

In this specification the term "corresponding" is used to denote a similarity of the R groups of an alcohol, $R \cdot CH_2 \cdot OH$, or of its ester,

and of the carboxylic acid, $R \cdot CO \cdot OH$, from which these are derived. Inasmuch as saturation of carbon to carbon double bonds of unsaturated R groups of the reacting components sometimes occurs in this process, our use of the term "corresponding" and of the symbol R denotes similarity of R groups in all respects except as to the number of unsaturated carbon atoms (and hence the number of hydrogen atoms) present in the group. Thus the R group of the organic acid may be saturated with respect to hydrogen or it may contain one, two, three, or more double bonds, whereas the "corresponding" R group or groups of the resulting alcohol or ester may contain the same number or a smaller number of double bonds, unless otherwise specified.

Our present process is based on our discovery that at relatively high temperature and pressure hydrogen readily and rapidly reacts with carboxylates of certain metals, especially carboxylates of lead, cadmium, and copper, with liberation of water, liberation of the metal (or possibly at times its oxide or hydroxide), and formation of either an alcohol, or an ester of this alcohol, or a mixture of alcohol and its ester.

When carried out under the preferred conditions herein described the alcohol residue and the acid residue (the term "residue" being used to denote the

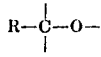

group of an acid or alcohol) of the ester which may be formed in the process are those which correspond to the acid in number of carbon atoms and configuration of carbon chains and substituent groups. When the reaction mixture includes salts of more than one carboxylic acid, mixed esters may result. It is our belief that the partial hydrogenation of the carboxylic group in the salt to form the corresponding alcohol is the primary reaction, and that the formation of ester is a subsequent and secondary reaction. In any event, our process converts the carboxylic group, —CO—O—, of the acid radical into the group —CH₂—O—, which is present both in the alcohol and in the ester.

When lead carboxylates are subjected to our process, relatively high yields of primary alcohols corresponding to the acid radicals of the carboxylates are obtained. Esters of these alcohols may also be formed, usually in lesser amounts.

When cadmium carboxylates are subjected to our process relatively high yields of esters are obtained, these esters having alcohol and acid residues corresponding to the acid radicals of the carboxylates. The reaction products may also include the corresponding alcohols, usually in relatively small amounts especially if carboxylates of other metals than cadmium are excluded.

When copper carboxylates are subjected to our process, relatively high yields of the corresponding primary alcohols are formed, usually accompanied by the corresponding esters in relatively smaller amounts. If the organic constituent of the copper carboxylates contains carbon to carbon double bonds, and especially if no appreciable amounts of other metallic carboxylates are present, addition of hydrogen at these double bonds tends to occur concurrently with the reduction of the carboxylic group. Consequently saturated alcohols and saturated esters may be produced from copper salts of unsaturated carboxylic acid, or, if desired, alcohols and esters which are unsaturated to a lesser degree may be produced from copper salts of more highly unsaturated carboxylic acids.

We have also found that when mixtures of carboxylates, the metallic constituent of which includes two or more metals, are subjected to our process, the percentage conversion of the —CO—O— group to the —CH₂—O— group is often higher than the conversion obtainable under comparable conditions with carboxylates of any one of the individual metals; furthermore, that the relative proportions of alcohols and esters produced, and the relative extent of concurrent saturation of unsaturated carbon bonds, are not readily predictable from a knowledge of the results obtained when carboxylates of the several metals of the mixture are hydrogenated individually. Mixtures of carboxylates of copper and cadmium, or cadmium and nickel, for example, give high yields of alcohols and relatively lower yields of esters. Mixtures of carboxylates of cadmium and chromium normally produce higher yields of free and combined alcohol than carboxylates of either metal when treated alone.

Carboxylates of chromium and of cobalt when hydrogenated alone under the conditions of our process have produced moderate yields of alcohols and esters. Relatively small yields of these products normally result when carboxylates of zinc, of manganese, of iron, or of nickel are hydrogenated alone; under these conditions the reaction products usually contain relatively larger amounts of the carboxylic acids themselves or of hydrocarbons. Mixtures of carboxylates, however, which include a plurality of these metals or one of these metals with lead, cadmium, or copper, may yield very substantial amounts of alcohols and esters, more than the amounts obtainable by hydrogenating the carboxylate of any metal of the mixture alone, a specific example of this being a mixture of chromium and zinc carboxylates.

In preparing to carry out our process we first obtain the salt of the carboxylic acid and of the chosen metal in any convenient way.

Metallic carboxylates may, for example, be formed in many cases by reacting the carboxylic acid with an oxide, hydroxide, carbonate, or other salt of the metal. A salt-forming procedure that is generally applicable for making water-insoluble carboxylates is to mix two aqueous solutions containing equivalent amounts, respectively, of the soluble sodium salt of the carboxylic acid (which may be made by reacting the carboxylic acid, or a glyceride or other ester of this acid, with an aqueous solution of sodium hydroxide) and of a water soluble inorganic salt of the metal. Thus we produce a precipitate of the desired carboxylate, which we then separate from the remaining solution and wash and dry, this salt in some cases being a basic rather than a normal salt.

Another method of making metallic carboxylates, which is especially convenient when the carboxylic acids are higher fatty acids, consists in saponifying triglycerides or other esters of the fatty acids with an oxide or hydroxide of a metal. Litharge, for example, may be agitated and heated with naturally occurring triglycerides by blowing a current of steam through this mixture, thus forming lead soaps of the fatty acids of the glycerides.

To carry out the essential steps of our continuous process, we introduce a continuous supply of the metallic carboxylic salt, in molten condition, and an adequate excess of hydrogen gas into a suitable reaction vessel wherein the reactants are maintained at a high temperature and under a high hydrogen pressure as hereinafter more fully explained, and wherein intimate contact between the gas and the liquids is brought about, and we continuously remove products of the reaction from another part or parts of the reaction vessel.

Instead of employing a single salt of a carboxylic acid, a mixture of a number of salts may be employed, comprising a plurality of metals or a plurality of carboxylic acids or a plurality of both.

Preferred conditions for our process include the maintenance of a temperature in the reaction zone between about 240° C. and about 400° C. and a pressure in excess of 2000 pounds per square inch. The alcohol and ester forming reactions occur, although more slowly, at temperatures below 240° C., down to 180° C. at least. Likewise these reactions have been observed under suitable temperature conditions at pressures as low as 500 pounds per square inch. When high yields of alcohols are desired, when operating continuously with a relatively small reaction vessel, we prefer to conduct the process at about 300°

C. to 400° C. and at a hydrogen pressure of at least 3000 pounds, and even more desirably at about 4000 pounds per square inch. When the carboxylates are those of a metal, or of a mixture of metals which forms an alloy, which melts below 400° C., we prefer to carry out the reaction at a temperature above the melting point of the metal or alloy. The most favorable temperature and pressure conditions cannot be more definitely stated because they vary with different carboxylates. It is well known that carboxylates vary in their stability at elevated temperature, and it is of course preferable to choose a reaction temperature for each carboxylate such that side reactions due to pyrolysis are not excessive.

Usually, especially when the object is to form alcohols in preference to esters, gaseous hydrogen is supplied to the organic salt undergoing reaction not only in amounts adequate for the reaction, which is 5 mols of hydrogen per 2 mols of carboxylic group for alcohol formation, or 3 mols of hydrogen per 2 mols of carboxylic group for ester formation, (in each case without making allowance for hydrogenation of carbon to carbon double bonds), but also in sufficient excess so that throughout the reaction there will be a relative preponderance of unreacted hydrogen as compared with water vapor and, especially when certain forms of reactors are used, so that the flow of hydrogen will aid in agitating the liquid reactants to promote intimate contact between the liquid and gaseous phases.

When the object is to form esters in preference to alcohols it is sometimes expedient to hydrogenate a mixture consisting of a metallic carboxylic salt and the corresponding free carboxylic acid, this mixture containing relatively more mols of salt than of free acid, instead of hydrogenating the salt alone.

In operating our continuous process, we find it preferable to preheat the supply of hydrogen to approximately the desired reaction temperature or even higher, and we also prefer to preheat the metallic carboxylates, at least to a moderate extent. Inasmuch as many of these carboxylates tend to decompose if held at the preferred reaction temperature of our process it is best, if they are to be fully preheated, to perform this step in a continuous and rapid manner immediately prior to the introduction of the carboxylates into the reaction chamber. When a flow of hydrogen in great excess is employed, it is possible to preheat the incoming hydrogen to so high a temperature that the carboxylates need not be heated more than enough to make them readily pumpable, and that no additional source of heat is required.

Although the reaction is a rapid one, we consider it important to make positive provisions for exposing the organic liquid reactants repeatedly to contact with the gaseous hydrogen while avoiding eddy currents in the liquid phase such as would transfer a significant proportion of the incoming carboxylates to the outlet of the reaction chamber before they have time to react with the hydrogen. Mechanical agitation may be used to promote mixing of the liquid and gaseous phases, but, because of the difficulty of providing such agitation under the very high pressures prevailing in the reaction zone, we prefer to bring about the necessary intimate contact between the two phases through the agency of the flow of either the one or the other or both of the principal reactants themselves. These conditions of mixing or contacting the gaseous and the organic liquid phase intimately and repeatedly, and of preventing excessive contamination of the outgoing reaction products with unreacted carboxylate, as well as other conditions which are peculiar to this process, may, we find, be satisfied in several different forms of reaction vessel. Among these are: a multi-stage reactor having compartments through which the hydrogen flows successively, entering each compartment near the bottom, while the liquid reaction mass flows in a general direction either concurrent with, or countercurrent to, the flow of the hydrogen; a reactor having vertical or sloping surfaces down which the liquid reactants flow in thin films, in contact with an atmosphere of hydrogen; and a reactor in which a finely divided spray of the carboxylate may be caused to fall through an atmosphere of hydrogen. Additional forms of reaction vessel which meet the essential requirements are obviously adaptable to use with our process.

The drawings illustrate schematically two forms of apparatus which are suitable for carrying out our process under advantageous conditions.

Figure 1 represents a form of apparatus in which turbulence in the liquid phase is caused by the upward flow of hydrogen therethrough and in which objectionable eddy currents are restricted by funnel-shaped baffles or partitions.

Figure 2 represents a form of apparatus in which the liquid reactants are caused to flow downward, in attenuated form, through an atmosphere of hydrogen.

In either form of apparatus the soap pump, reaction vessel, condenser, high pressure receiver and trap, hydrogen pump and preheater, pipe lines, and other parts of the equipment in which high pressures are maintained, are designed to withhold safely an internal pressure of at least 5000 pounds per square inch, and they are preferably well lagged with heat insulating material. The main reaction vessel is provided with some suitable heating means, unless provisions are made to preheat one or both of the incoming raw materials to a sufficient extent to provide all the heat required in the reactor.

*Example 1.*—As an example of the practice of our process with the apparatus illustrated in Figure 1, we will describe a typical operation in which lead soaps of coconut oil fatty acids are reduced to the corresponding alcohols, consisting principally of lauryl alcohol and myristyl alcohol.

The lead soaps of coconut oil mixed fatty acids may be prepared by mechanically agitating a mixture of these acids and litharge, in proportions equivalent to normal lead soaps, at a temperature of about 120° C. to 140° C., until the yellow color of the litharge has substantially disappeared. The resulting soaps are settled until clear and decanted from whatever insoluble matter may have dropped out.

These lead soaps, which may be melted conveniently by means of high pressure steam in a closed coil in supply tank 10, and maintained in this tank at a temperature of about 150° C., are transferred by means of high pressure pump 11 into the lowest compartment of the enclosed multi-stage reaction vessel 13, in which they are heated to about 340° C. by heating coils or a heating jacket (not shown) or by contact with sufficiently hot incoming hydrogen. A flow of hydrogen gas is continuously supplied through preheater 14 and the perforated distributing element 15 below the surface of the lead soaps in this same compartment of the reaction vessel. The hydrogen enters the reaction vessel at a temperature which usually ranges from about 340° C. to about 450° C., depending on whether the hydrogen is or is not the principal agency for supplying heat to the reactor contents. The lead soaps and the alcohols formed by the reaction, and also the hydrogen, move upwardly through the reaction vessel, passing successively from one compartment to the other. The funnel shaped baffles or partitions 16, which divide the reaction vessel into compartments, are each provided with an opening 18, as well as with a central opening 19, as shown, to permit the passage of materials from one compartment to the other. These partitions serve to prevent eddy currents such as would sweep some portions of the incoming lead soaps to the outlet at the top of the vessel before they had adequate opportunity to come into contact with hydrogen. The volumetric rate of hydrogen flow through the reaction vessel is preferably in the order of 15 to 30 times the volumetric rate of liquid flow through this vessel, and as a result effective mixing of the organic liquid and the gaseous phase is brought about in each campartment of the reactor. We find that two to three compartments in the reaction vessel are sufficient for reasonably satisfactory results but we prefer to provide at least four or five of these compartments.

Molten metallic lead is liberated as a result of the reaction, and because of its great density it settles to the bottom of the reaction vessel, passing from upper compartments through baffle openings 19, and collects in a pool at the bottom. It is withdrawn either continuously or periodically through the bottom outlet 20 of the reaction vessel. It may either be collected in molds for cooling in solid pig form, or it may be sprayed into a tower for solidification in finely divided form or for oxidation to lead oxide, suitable for reuse in making more lead soap.

The organic liquid reaction products and the unreacted excess of hydrogen, together with vaporized fatty alcohols and water vapor formed by the reaction, pass out of the upper part of the reaction vessel through outlet 22 into high pressure receiver 23. The gaseous materials pass into condenser 24 in which vaporized alcohols and most of the water are condensed, thence through trap 27. Condensate collecting in receiver 23 and trap 27 are drained, either periodically or continuously, into low pressure product receiving tank 28. The hot reaction products which collect in receiver 23 may be cooled by means of cooling coils within this receiver (as indicated in Fig. 1), or by passing through a cooler on their way to tank 28, or by flash evaporation of the water they contain as they are released to atmospheric pressure.

The excess of hydrogen is normally recirculated through a return line 29 by means of pump 31. This recirculated hydrogen is augmented by the addition of fresh hydrogen from a high pressure hydrogen supply, indicated at 32, which is maintained under a pressure of 4000 pounds per square inch or higher. The rate of introduction of fresh hydrogen from supply 32 is regulated so as to maintain the desired operating pressure of about 4000 pounds per square inch in the hydrogenating system.

Hydrogen pump 31 is operated at a speed, in relation to its capacity per revolution or per stroke, sufficient to provide a volume rate of hydrogen to the reaction vessel which may suitably be about 22 times the volume rate of the incoming molten lead soaps. This corresponds to a hydrogen supply about 15 times that theoretically required to reduce the lead soaps.

With a small reaction vessel, having an internal diameter of 1.6 inches and a height of 31 inches, and divided into five compartments, we have obtained an alcohol yield about 95 per cent of theoretical with a soap input rate of 6.6 pounds per hour, and a hydrogen rate of 2.15 cubic feet per hour measured at 4000 pounds per square inch pressure and at 340° C.

*Example 2.*—As another example of our process, employing a different form of apparatus, molten lead soaps of coconut oil acids were pumped, at 350° C., as a fine stream into the upper part of a vertical cylindrical reaction vessel in which an atmosphere of hydrogen at 3000 pounds per square inch pressure was maintained. In a free drop of 30 inches, a 50% reduction of the soaps to the corresponding alcohols occurred.

In this modification of our process increased yields are obtainable by spraying the soap in more finely divided form and by providing a longer path of fall for the atomized liquid through the atmosphere of hydrogen. For this purpose apparatus corresponding to that represented in Figure 2 may be employed. This differs from the apparatus of Figure 1 chiefly in that the tall spray chamber 113 is employed as the reaction vessel, and the flow of carboxylates is downward instead of upward.

The lead soaps are melted in tank 110, transferred thence by pump 111 through preheater 112 to spray nozzle 117, from which the hot soap issues in atomized form and falls down through the atmosphere of hydrogen which is maintained in reaction chamber 113.

The flow of hydrogen is generally similar to its flow in the apparatus of Fig. 1, i. e., from supply 132 and return line 129 the hydrogen is forced by pump 131 through preheater 114 into the lower part of chamber 113 through inlet 115. The outlet gases leave chamber 113 through outlet 122, passing thence through trap 123 and condenser 124 to return line 129. The volume rate of hydrogen flow through the reaction vessel of Fig. 2 may be much lower than the preferred rate through the reactor of Fig. 1.

Liquid organic reaction products leave the reaction chamber through outlet 125 and drain into high pressure receiver 126, which may be provided with a cooling coil as shown. Vaporized reaction products which condense in condenser 124 also drain into receiver 126. From this receiver the liquid products are withdrawn into low pressure receiving tank 128. Molten lead is withdrawn from the reaction chamber through bottom outlet 120.

*Example 3.*—As another example, cupric soaps of coconut oil fatty acids were caused to flow continuously in thin films over vertical surfaces and sloping baffles, in contact with hydrogen at 3800 pounds per square inch pressure and at a temperature of 260° C. to 280° C. A reduction of about 30% of the soaps to alcohols occurred during a drop of 30 inches, measured vertically. The liquid reaction products, which are normally removed continuously from the bottom of the reaction vessel, contain finely divided copper which may be settled out in a receiving vessel.

In Examples 2 and 3 a relatively slow flow of hydrogen was maintained, sufficient only to make up for hydrogen absorbed in the reaction and dissolved in the outgoing liquid products, and effectively to remove the water vapor formed by the reaction.

Other examples of our process are:

*Example 4.*—The production of stearyl stearate, by pumping cadmium stearate at a rate of 5 pounds per hour into the reaction vessel described in Example 1, introducing preheated hydrogen at 3000 pounds per square inch pressure and at a volume rate of 1 cubic foot per hour, meaured under the conditions existing in the reaction vessel, and maintaining a temperature of about 340° C. in the vessel.

*Example 5.*—The production of benzyl alcohol by continuously pumping lead benzoate into a reaction vessel of the type described in Example 1, introducing a large excess of preheated hydrogen at 4000 pounds per square inch pressure, and maintaining a temperature of about 340° C. in the vessel.

*Example 6.*—The production of alcohols corresponding to coconut oil mixed fatty acids by causing molten lead soaps of these fatty acids to flow continuously down the surfaces and baffles of the reactor referred to in Example 3 at 350° C., in contact with an atmosphere of hydrogen maintained at 3000 pounds per square inch pressure. A reduction to alcohols of about 60% of theoretical is obtainable during a drop of 30 inches, measured vertically.

In addition to the processing conditions previously referred to in the general discussion and specific examples of our process, it may be said that favorable results are most easily obtained by employing carboxylates of a metal, or of a mixture of metals which forms an alloy, having a melting point below 400° C. (and, as previously mentioned, maintaining the reaction temperature above this melting point); also, by employing conditions of temperature, pressure, and gas-liquid contact such that free metal is liberated sufficiently rapidly and in sufficient concentration to permit rapid fusing together of the individual droplets, thus minimizing the formation of troublesome emulsions of the metal in the organic liquid phase; also, the avoidance of thermal decomposition of the carboxylates entering the process and of the organic reaction products, by keeping the time that these materials are maintained at the high reaction temperature to a very minimum.

It is to be understood that our process is not limited to the reactants or types of reaction chambers mentioned in the foregoing specific examples. The process is generally applicable, and moderate to good product yields are obtainable with carboxylates (comprising those of the preferred metals) which are sufficiently thermostable under conditions favorable to rapid reaction. We have found that continuous operation of this process becomes feasible, either (1) when an excess of hydrogen is caused to flow with a continuously supplied mass of the carboxylate, under conditions such as to cause turbulence in the mass—as by bubbling the gas through the liquid, or flowing the gas over the liquid under conditions of turbulence—in either case restricting eddy currents which would contaminate the organic products with unchanged carboxylates; or (2) when a continuous flow of the carboxylate in attenuated form (by which we mean in thin films or small droplets) is passed through an atmosphere of hydrogen.

Our process is capable of application to many varied raw materials to produce many useful products. Higher fatty alcohols having at least eight carbon atoms, which may be sulfated or sulfonated for use in detergents or wetting agents or emulsifying agents, may for example be made from fatty oils or their fatty acids.

This process may also be employed to form alcohols or esters or both from rosin acids, or from mixtures of rosin acids and fatty acids. These products, and also unsaturated alcohols and unsaturated esters made by our process from fatty acids derived from drying oils, may be used in the preparation of improved drying compositions for use in paint, varnish, and related products.

Another use for this process is in the manufacture of synthetic waxes, composed principally or entirely of esters of fatty acids and high molecular weight alcohols. Convenient raw materials for use in making synthetic waxes are fatty acids derived from glyceride oils and rosin acids. Either saturated or unsaturated acids may be employed, and the melting point and related properties of the product may be controlled both by choice of raw materials and by the degree of saturation of double bonds that is caused to occur during the treatment with hydrogen.

Having thus described our invention, what we claim and desire to secure by Letters Patent is:

1. The process which consists essentially in flowing hydrogen and metallic carboxylates continuously into a reaction chamber, the metallic constituent of said carboxylates comprising a substantial proportion of a metal selected from the group consisting of lead, cadmium, and copper, and maintaining within said chamber a reaction temperature and hydrogen pressure sufficiently above atmospheric to effect substantial reduction of the carboxylic group, —CO—O—, of said carboxylates to the group, —CH$_2$—O—, with resulting formation of a product of the class consisting of primary alcohol and ester thereof, and continuously removing products of said reaction from the reaction chamber.

2. The discrete process step which consists essentially in subjecting metallic carboxylates to reaction with hydrogen at a temperature between about 240° C. and about 400° C. and under a sufficient pressure, at least 2000 pounds per square inch, to hydrogenate the carboxylic group, —CO—O—, to the group —CH$_2$—O—, the metallic constituent of said carboxylates comprising a substantial proportion of a metal selected from the group consisting of lead, cadmium, and copper, said step being conducted in a continuous manner by continuously introducing said carboxylates, in molten condition, into an enclosed reaction zone, maintaining in said zone an atmosphere of hydrogen at said pressure, bringing about intimate contact between hydrogen and carboxylates in said zone by the flow therethrough of at least one of said reactants, and continuously removing from said zone products of said reaction and unreacted hydrogen.

3. The process of forming primary alcohol and ester of said alcohol from corresponding metallic carboxylates which comprises reacting hydrogen with said carboxylates without added catalyst at a temperature between about 240° and about 400° C. and at a pressure above 2000 pounds per square inch, the metallic constituent of said carboxylates comprising a substantial proportion of a metal selected from the group consisting of lead, cadmium, and copper, said reaction being conducted in a continuous manner by continuously introducing said carboxylates, in molten condition, into an enclosed reaction zone, maintaining in said zone an atmosphere of hydrogen at said pressure, bringing about intimate contact between hydrogen and carboxylates in said zone by the flow therethrough of at least one of said reactants, and continuously removing from said zone products of said reaction and unreacted hydrogen.

4. The process of forming reaction products of the group consisting of a primary alcohol of the series $C_nH_{(2n+1)}CH_2OH$ and the corresponding ester of the series $C_nH_{(2n+1)}COOCH_2C_nH_{(2n+1)}$ by hydrogenating a metallic salt of the corresponding carboxylic acid of the series $C_nH_{(2n+1)}COOH$ which comprises subjecting said salt to contact with hydrogen at a temperature between about 240° and about 400° C. and at a pressure above 2000 pounds per square inch, without added catalyst, the metal of said salt being selected from the group consisting of lead, cadmium, and copper, said hydrogenation being conducted in a continuous manner by continuously introducing said salt, in molten condition, into an enclosed reaction zone, maintaining in said zone an atmosphere of hydrogen at said pressure, bringing about intimate contact between hydrogen and metallic salt in said zone by the flow therethrough of at least one of said reactants, and continuously removing from said zone products of said reaction and unreacted hydrogen.

5. The process which comprises reacting hydrogen with lead salts of mixed fatty acids consisting principally of lauric and myristic acids at a temperature between about 240° and about 400° C. and at a pressure above 2000 pounds per square inch, whereby reaction products of the group consisting of alcohols corresponding to said fatty acids and esters of said alcohols are formed, said reaction being conducted in a continuous manner by continuously introducing said lead salts, in molten condition, into an enclosed reaction zone, maintaining in said zone an atmosphere of hydrogen at said pressure, bringing about intimate contact between hydrogen and lead salts in said zone by the flow therethrough of at least one of said reactants, and continuously removing from said zone products of said reaction and unreacted hydrogen.

6. The process which comprises subjecting a lead salt of a saturated aliphatic acid to reaction with hydrogen at a reaction temperature and hydrogen pressure sufficiently above atmospheric to effect substantial formation of a product of the class consisting of the primary alcohol corresponding to said carboxylic acid and ester of said alcohol, said reaction being conducted in a continuous manner by continuously introducing said lead salt, in molten condition, into an enclosed reaction zone, maintaining in said zone an atmosphere of hydrogen at said pressure, bringing about intimate contact between hydrogen and lead salt in said zone by the flow therethrough of at least one of said reactants, and continuously removing from said zone products of said reaction and unreacted hydrogen.

7. The process which comprises subjecting a lead salt of a saturated aliphatic acid to reaction with hydrogen at a reaction temperature and hydrogen pressure sufficiently above atmospheric to effect substantial formation of a product of the class consisting of the primary alcohol corresponding to said carboxylic acid and ester of said alcohol, said reaction being conducted in a continuous manner by: introducing a continuous supply of said lead salt, in a molten condition, into a reaction chamber and maintaining said salt at said reaction temperature; continuously introducing an excess of hydrogen into said chamber at said pressure, and flowing said hydrogen in intimate contact with said salt to cause turbulence therein; preventing excessive contamination of the outgoing organic reaction products with unreacted salt by restricting eddy currents in the liquid reactants; removing non-metallic products of said reaction from a portion of said chamber that is remote from the salt inlet; continuously removing the unreacted excess of hydrogen after its passage in contact with said molten salt; and removing from the lower part of said chamber metallic lead resulting from said reaction.

8. The process which comprises subjecting a lead salt of a saturated aliphatic acid to reaction with hydrogen at a reaction temperature and hydrogen pressure sufficiently above atmospheric to effect substantial formation of a product of the class consisting of the primary alcohol corresponding to said carboxylic acid and ester of said alcohol, said reaction being conducted in a continuous manner by: continuously passing said lead salt, at said reaction temperature and in attenuated form, downwardly through an enclosed reaction chamber; maintaining in said chamber in contact with said lead salt an atmosphere of hydrogen at said pressure; and removing liquid reaction products from the lower part of said chamber.

9. The process which comprises subjecting a lead salt of a saturated aliphatic acid to reaction with hydrogen at a reaction temperature and hydrogen pressure sufficiently above atmospheric to effect substantial formation of a product of the class consisting of the primary alcohol corresponding to said carboxylic acid and ester of said alcohol, said reaction being conducted in a continuous manner by flowing said lead salt, in a continuous stream, and an excess of hydrogen into the lowest compartment of a multi-compartment reaction chamber, passing said reactants and non-metallic reaction products thereof upwardly through said compartment and through a restricted passage into another compartment of said chamber, removing from the uppermost compartment of said chamber non-metallic products of said reaction and the unreacted excess of hydrogen, and removing from the lower part of said chamber metallic lead resulting from said reaction.

10. The process of claim 6, conducted at a reaction temperature higher than the melting point of lead and at a hydrogen pressure in excess of 3000 pounds per square inch, and in which the saturated aliphatic acid is one having at least eight carbon atoms.

11. The process of claim 7, conducted at a reaction temperature higher than the melting point of lead and at a hydrogen pressure in excess of 3000 pounds per square inch, and in which the saturated aliphatic acid is one having at least eight carbon atoms.

12. The process of claim 8, conducted at a reaction temperature higher than the melting point of lead and at a hydrogen pressure in excess of 3000 pounds per square inch, and in which the saturated aliphatic acid is one having at least eight carbon atoms.

13. The process of claim 9, conducted at a reaction temperature higher than the melting point of lead and at a hydrogen pressure in excess of 3000 pounds per square inch, and in which the saturated aliphatic acid is one having at least eight carbon atoms.

14. The process of forming primary alcohol and ester of said alcohol from corresponding metallic carboxylates which comprises reacting hydrogen with said carboxylates without added catalyst at a temperature between about 240° and about 400° C. and at a pressure above 2000 pounds per square inch, the metallic constituent of said carboxylates comprising a substantial proportion of a metal selected from the group consisting of lead, cadmium, and copper, said reaction being conducted in a continuous manner by flowing said carboxylate, in a molten condition and in a continuous stream, and an excess of hydrogen into the lowest compartment of a multicompartment reaction chamber, passing said reactants and non-metallic reaction products thereof upwardly through said compartment and through a restricted passage into another compartment of said chamber, removing from the uppermost compartment of said chamber non-metallic products of said reaction and the unreacted excess of hydrogen, and removing from the lower part of said chamber free metal resulting from said reaction.

15. The process which consists essentially in flowing hydrogen and metallic carboxylates continuously into a reaction chamber, the metallic constituent of said carboxylates comprising a substantial proportion of a metal selected from the group consisting of lead, cadmium, and copper, and maintaining within said chamber a reaction temperature and hydrogen pressure sufficiently above atmospheric to effect substantial reduction of the carboxylic group, —CO—O—, of said carboxylates to the group, —CH$_2$—O—, with resulting formation of a product of the class consisting of primary alcohol and ester thereof, imparting relative movement within said chamber to the hydrogen and carboxylate reactants, and continuously removing products of said reaction from the reaction chamber while retarding movement of unreacted carboxylates through and out of said chamber to minimize contamination therewith of the removed products.

16. The process which consists essentially in flowing hydrogen and, at a materially less volumetric rate, metallic carboxylates continuously into one portion of a reaction chamber, the metallic constituent of said carboxylates comprising a substantial proportion of a metal selected from the group consisting of lead, cadmium, and copper, and maintaining within said chamber a reaction temperature and hydrogen pressure sufficiently above atmospheric to effect substantial reduction of the carboxylic group, —CO—O—, of said carboxylates to the group, —CH$_2$—O—, with resulting formation of a product of the class consisting of primary alcohol and ester thereof, and continuously removing products of said reaction from another portion of the reaction chamber.

ALBERT S. RICHARDSON.
JAMES E. TAYLOR.